Nov. 29, 1927.
O. YOUSE
1,650,680
SHOCK ABSORBER
Filed April 1, 1926
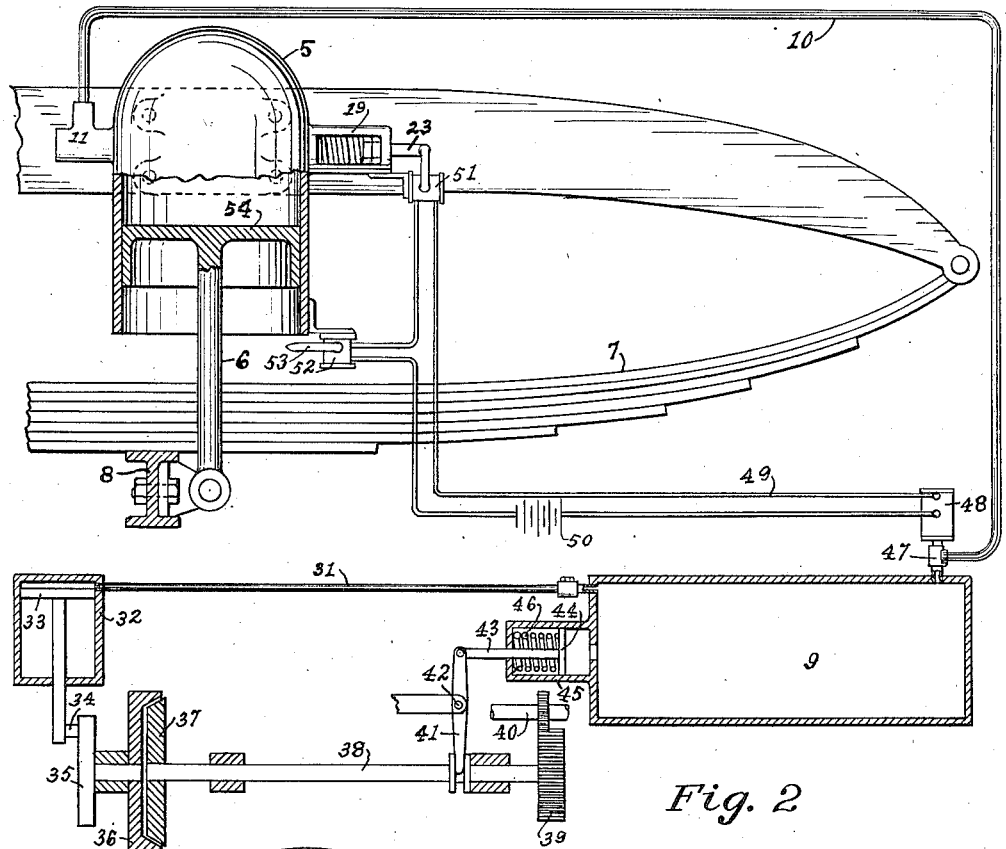
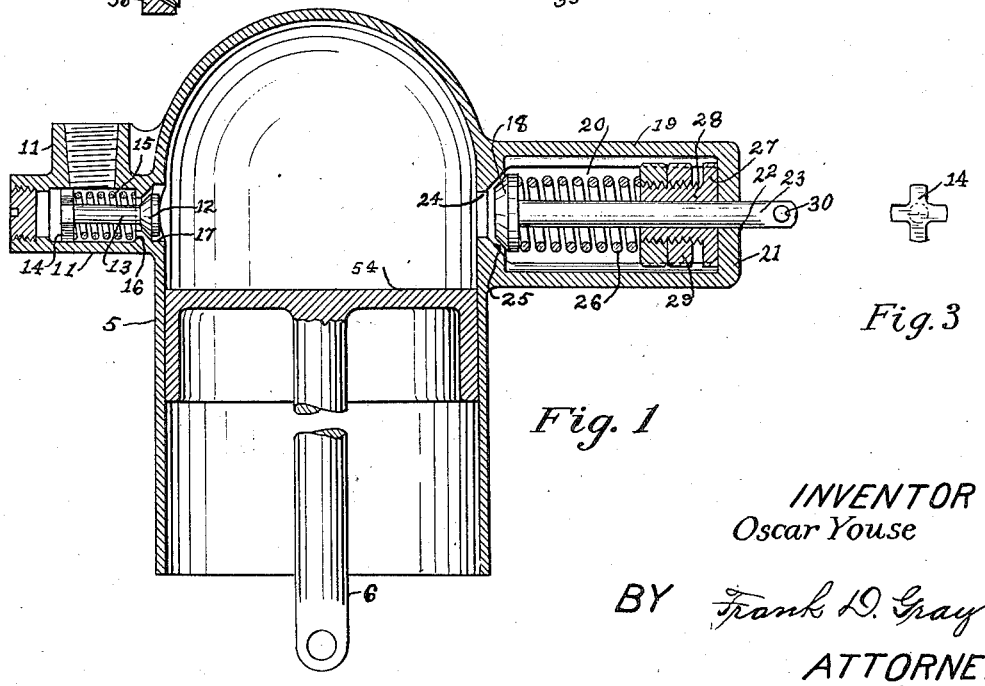
Fig. 2
Fig. 3
Fig. 1
INVENTOR
Oscar Youse
BY Frank D. Gray
ATTORNEY Patented Nov. 29, 1927.

1,650,680

UNITED STATES PATENT OFFICE.

OSCAR YOUSE, OF ANGOLA, INDIANA.

SHOCK ABSORBER.

Application filed April 1, 1926. Serial No. 99,046.

This invention relates to shock absorbers and more especially to shock absorbers operating under pneumatic compression and which are suitable for sustaining the load against extreme relative movement of the same and the support therefor, as in use of the absorber for avoiding extreme collapse of a vehicle spring or a sudden and violent reaction from the said collapse.

It is therefore an object of my invention to provide a shock absorber comprising therein a cylinder having one closed and one open end and a piston playing therein, these two parts being attached to members of the relatively movable load and support therefor, and mechanism, controlled by the pressure in the closed end of the cylinder, for relieving or increasing the pressure above the piston, in accordance with the movement of the latter in the cylinder.

It is a further object of my invention to provide a shock absorber comprising a piston and cylinder construction having entrance and relief pipes for communication with the closed end of the cylinder above the piston, these pipes having controlling valves therein actuated by means that is operated by the movement of the piston, through the intermediacy of pump mechanism for varying the internal pressure of the cylinder, as will be fully explained.

It is a still further object of my improvements to utilize an electric current for operating or controlling the pump for providing increased pressure in the piston cylinder of my absorber, there being suitable switches for closing or breaking the said circuit which are automatically operated by the piston in its movement relative to the cylinder.

With these and other objects in view I have devised the construction hereinafter described and illustrated in the accompanying drawings in which Figure 1 is a central, longitudinal section of my improved cylinder and piston members with attached parts;

Figure 2 is a diagrammatic representation of my shock absorber with related structures for its control, the piston and cylinder being shown partly in section and all parts shown on a smaller scale than in Fig. 1, and Figure 3 is a detail view of the valve guide.

My invention is applicable to various constructions in which parts are mounted for yielding movement relative to each other, and for purposes of illustration, I have shown the cylinder 5 and piston rod 6 attached to the upper and lower members of the spring 7, respectively, the piston rod being connected directly to the part 8 which may be the axle of a vehicle.

I provide underneath the car or other vehicle, preferably, a storage casing or reservoir 9 which is in communication with the cylinder 5 by a pipe 10 suitably attached to a valve tube 11 in which is encased a valve 12 within the cylinder and carrying a rod 13 having a movable guide 14 which is normally held at its outermost position in the tube 11 by a coiled expansion spring 15 tending to separate 14 from a shoulder 16 adjacent the valve opening 17. This tends to normally close this valve 12 and to open the latter only when the pressure in the pipe 10 against the surface of the valve 12 is sufficient to overcome the force of the spring 15 tending to close said valve. The pressure in the pipe 10 is controlled by the pressure in the reservoir 9 which latter is varied somewhat by means to be described later. The guide 14 for the rod is provided merely for its guiding function, it being quite open in outline, as shown in Fig. 3.

At another portion of the cylinder 5, as at a point opposite the valve 12, is provided an outwardly-opening valve 18 which is movable lengthwise of a skeleton frame 19 whose longitudinal openings 20 may well be large enough to permit assemblage of the valve parts. This frame has an end piece 21 provided with an aperture 22 adapted to receive therein the guide rod 23 of the valve. The frame is connected with the cylinder wall by an opening 24 having an outward seat 25 against which the valve 18 is normally pressed by a coil spring 26 mounted about the rod 23. It is my purpose to make the normal pressure of this spring against 18 adjustable within rather wide limits, by providing within the frame and mounted upon the rod 23, a washer 27 in which the rod is movable quite loosely, the washer having a concentric sleeve member 28 externally threaded to receive thereon one or more nuts 29, against the innermost one of which the rear end of the spring 26 is held, so that relative rotation of the nuts on the sleeve will compress or release the spring, depending on the direction of rotation.

The rod 23 extends outside of the frame and is provided with an aperture 30 for a purpose later to be explained. So far as has been explained, the internal pressure of the cylinder will obviously tend to close valve 12 and open valve 18, in the former case acting with the spring 15 and in the latter case acting against the spring 26.

Referring again to parts in Fig. 2, it is to be noted that the internal pressure of the reservoir 9, and thereby of the pipe 10 and tube 11, is varied by inflow of fluid through pipe 31 from a pump 32. The latter is operated by a piston 33 connected to a crank pin 34 on a disc 35 actuated by the clutch member 36. The clutch mate 37 is actuated by shaft 38 driven from gear 39 in turn driven from engine shaft 40. This pump mechanism is controlled by shifting the clutch member 37 into or out of engagement with member 36, as may well be done by lever 41 pivoted to the frame at 42, and the other end of the lever actuated by link 43 from the piston 44 working in chamber 45 and normally pressed toward the reservoir wall by coil spring 46, and yielding to increased internal pressure in the reservoir to release the clutch and thereby stop the operation of the pump. It will thus be seen that abnormally low pressure in the reservoir 9 will start the pump, and eventually increase such pressure to normal. The shaft 38 rotates continuously while the engine is running.

Since the internal pressure of the reservoir will vary with the flow therefrom in the pipe 10, it is clear that the operation of the valve 12 will determine indirectly whether the pump 32 will be in commission. To control this flow through pipe 10, a valve 47 is provided to open or close entrance from the reservoir into 10. This valve 47 is actuated to remain in a normally open position by a solenoid at 48, and controlled by an electric circuit 49, as will now be explained. This circuit is electrified by a battery 50 and may be opened or closed by switches 51 or 52. The former is operated by connection with the aperture 30 of rod 23, and is closed when the valve 18 is closed which is its normal position as shown in Fig. 1, and switch 52 is also normally closed as shown in Fig. 1 but will be actuated to open by the falling of the piston 54. When both these switches are closed, the valve 47 will be opened, fluid will flow from 9 into 10, and the consequent lower pressure in 9 will start the pump.

Operation:—Normally, the nuts 29 are adjusted so that the compression of spring 26 is just sufficient to close valve 18, and such normal pressure in the cylinder will also close valve 12, the pressure in the pipe 10 and in the valve tube 11 being normally too weak to overcome the tendency of the cylinder pressure to close 12. The nuts 29 are therefore always adjusted to reduce the internal pressure of the cylinder to the point at which both valves 12 and 18 will be normally closed.

Normally, the switches 51 and 52 are closed, switch 51 being opened by the opening of the valve 18, and the switch 52 being opened by the falling of the piston 54 operating the arm 53 of the latter switch. This switch 52 is normally closed by internal spring force of conventional character. With now the switches both closed as indicated in Fig. 2, assuming that the piston rod 6 forces the piston 54 violently upward, as by the collapse of the spring 7, the internal pressure in the cylinder above the piston will be greatly increased, valve 18 will open to cause relief of said pressure, and at the same time, switch 51 will open. Under these conditions, the circuit is broken and the valve 47 is closed, as it always remains while the circuit 49 is broken for any reason. The pump 32 therefore remains idle because of the pressure in 9 remaining at normal or above.

With the reaction which is inevitable, the piston 54 descends rarefying the fluid in the cylinder, causing valve 18 to close again and switch 51 to close. When the piston 54 descends the switch 52 will remain closed at first, and at the same time valve 12 opens, permitting fluid to flow from 9 through 10 and 11 into the cylinder, since the valve 47 is now opened. But when the piston 54 descends far enough, it will open the switch 52, opening the circuit and permitting the valve 47 to close, the pressure in 9 to increase, and eventually the pump will stop. The pump 32 will now remain idle until the condition again exists where the circuit 49 will again be closed whereby the valve 47 will be again opened by the solenoid 48.

My improved structure therefore provides a cushioning effect by the piston and cylinder structure to greatly modify the sudden resistance of the spring 7 supporting the weight of the load yieldingly upon the axle 8 or other bar. But my improved structure provides more than the usual pneumatic resistance to modify the action of the spring. It provides in addition to such resistance, automatic mechanism for returning one of the members of such mechanism to a normal position relative to the other element of such mechanism, thus not only greatly increasing the "throw" of the piston within the cylinder, but also quite forcibly and definitely limiting the reaction from such movement of the elements in either direction, the latter affording a real effective snubbing action.

The increasing in the "throw" of piston 54 due to jolt or violent thrust of the piston into the cylinder, above what it would have without my improved automatic mechanism including the valves 12 and 18, is due obviously to the fact that when the piston starts in its upward thrust, the valve 18 opens and releases some of the cylinder fluid, thus permitting the piston to travel to a greater length of stroke than it would travel otherwise. Also, when the piston descends as the result of the reaction following such thrust, the inflow of fluid through 12 permits a greater descent of the piston than it would have otherwise. It is to be understood that, after such a violent jolt, my improved automatic structure associated with the piston and cylinder, will gradually return the piston to its former normal position in the cylinder where the valves 12 and 18 are both closed, the valve 47 open and the circuit 49 closed, while the pump 32 will be idle in which condition it will remain until the pressure in 9 is again reduced.

No detailed means for mounting the shock absorber members between yielding movable elements are shown, as my structure may be used between many kinds of relatively movable elements. It is here shown as used on a vehicle, but its use is by no means confined to such device.

Having thus described my invention, what I claim as new, and desire to secure by Letters Patent, is—

1. A shock absorber mounted between a load and its support and comprising a piston mounted for movement in a cylinder having one open and one closed end, a source of compressed fluid, an electric circuit and solenoid for controlling the flow of fluid from said source to the closed end of the cylinder, means actuated by the piston to open said circuit and prevent said flow when the cylinder fluid is abnormally rarefied or compressed, and to close the circuit and permit said flow when such cylinder fluid is at normal pressure and the pressure of fluid at said source abnormally high.

2. A pneumatic shock absorber comprising a piston working in a cylinder having one open and one closed end, in combination with a compressed fluid reservoir, a pump for filling said reservoir, means automatically controlled by the pressure in the reservoir for actuating the pump, electrically-controlled means for automatically opening the passage from the said reservoir to the closed end of said cylinder when the cylinder fluid is abnormally rarefied and for closing such passage when the cylinder fluid is unduly compressed.

3. A pneumatic shock absorber comprising a piston mounted for movement in a cylinder having an open and a closed end, a release valve in said closed end, means for supplying fluid under pressure to said closed end and an electrical solenoid circuit for controlling said supply means, in combination with two switches in said circuit one mounted on the open end of said cylinder and the other connected with said release valve, both switches being normally closed, means actuated by abnormal pressure in said closed end of the cylinder for opening the switch connected with the release valve and means actuated by the piston in its extreme downward thrust for opening the switch on the open end of the cylinder and thereby open the said circuit.

In witness whereof I have hereunto set my hand this 27th day of March, 1926.

OSCAR YOUSE.